June 13, 1933.   A. ANDREAS   1,913,868
MACHINE FOR WEIGHING AND PACKING POWDERED MATERIAL
Filed Feb. 16, 1928   2 Sheets-Sheet 1
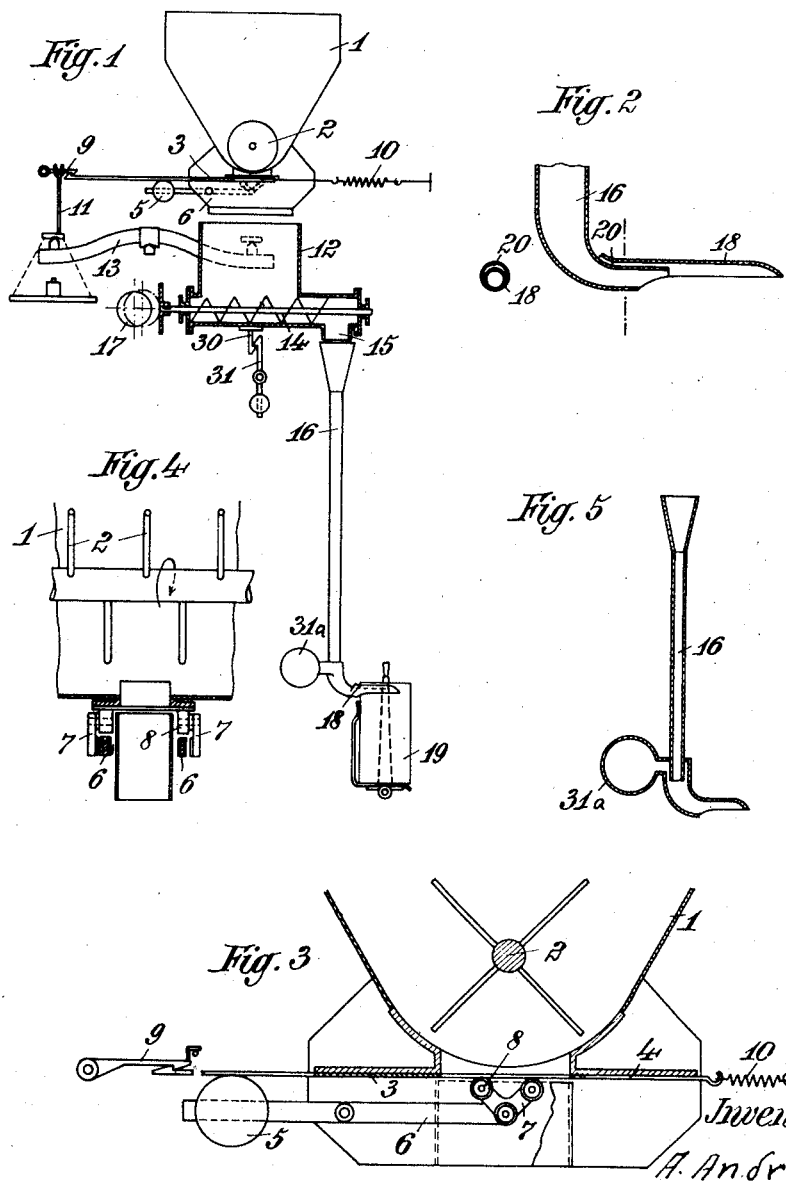

June 13, 1933.    A. ANDREAS    1,913,868
MACHINE FOR WEIGHING AND PACKING POWDERED MATERIAL
Filed Feb. 16, 1928    2 Sheets-Sheet 2
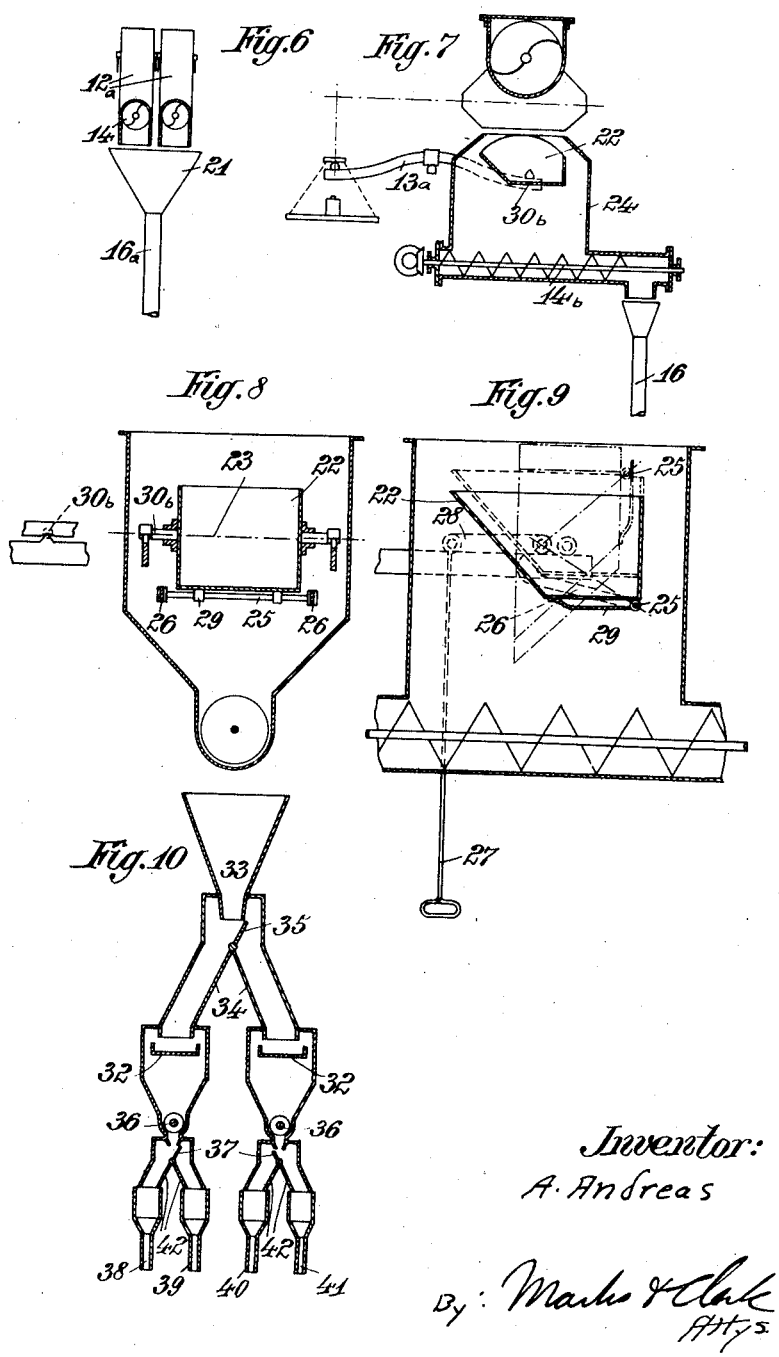
Inventor:
A. Andreas
By: Marks & Clark
Attys.

Patented June 13, 1933

1,913,868

UNITED STATES PATENT OFFICE

ARNO ANDREAS, OF MUNSTER, GERMANY

MACHINE FOR WEIGHING AND PACKING POWDERED MATERIAL

Application filed February 16, 1928, Serial No. 254,870, and in Germany January 12, 1927.

This invention relates to machines for weighing and packing powdered material such as cement, and more particularly to packing machines for weighing and packing powdered material into automatically closing valve bags.

In the packing machines at present used for the filling and weighing of automatically closing valve bags, the process of filling and the process of weighing are combined into a single working operation. As the valve bag packing machines are chiefly machines for quick packing, the combination of filling and weighing to a single process does not allow of an accurate weighing, consequently such machines have not been up to now capable of calibration.

The invention provides a packing machine which is free from the above mentioned drawbacks. First of all, the process of weighing and the process of filling are separated from each other, and the weighing machine, in moving up and down, has to perform no work other than to release forces which perform the work required, that is to say the shutting off of the material flowing into the weighing machine and the like. For this reason, the weighing machine may be built as a precision balance.

Several constructions are illustrated by way of example in the accompanying drawings.

Figure 1 shows the filling machine in elevation.

Figure 2 shows the bottom part of the filling tube on an enlarged scale.

Figures 3 and 4 are detail views of the quick-action slide closing device.

Figures 5 to 10 show modified constructions.

In a trough or hopper 1 which may for instance be three-quarters filled with the material, is arranged a constantly rotating mixer 2 by which the material is loosened and maintained in this state. Directly below the hopper 1 is mounted a quick-action closing slide 3 which is opened by hand and closed by the weighing machine on the weight being reached. This slide (see also Figures 3 and 4) is constituted by a piece of thin elastic steel plate which is pressed from below against a smooth surface 4 of the outlet by means of two levers 6 rotatable independently of each other and weighted with balance weights 5, and by means of bell crank levers 7 mounted on the levers 6 in a freely rotatable manner and provided each with two rollers 8 at the free ends.

This method of pressing ensures a uniform pressure on all sides and a perfectly tight closing of the slide, without rendering the opening and closing more difficult on account of the excessive pressure and without increasing the wear. A wear which of course must occur in time, can never lead to a faulty closing of the slide, as the latter can always be pressed to a greater extent.

The slide 3 is pulled by hand or by means of any desired device into the open position until it is locked by a pawl 9 which can be released by the weighing machine 13 by means of a rod 11. During the opening of the slide, a spring 10 is cocked which, on the release of the locking pawl 9, at once closes the slide and thus makes accurate weighing possible. Between the rod 11 and the pawl 9 may further be inserted a tipping weight which would be turned over owing to the movement of the weighing machine by means of the rod 11 and thus release the locking pawl. This last arrangement has the advantage that the resistance offered to the weighing machine will always be the same. The pulling back of the weight is effected by the same operation by which the slide is opened.

The goods or material escaping after the opening of the closing device 3 falls into a container 12 which is mounted on one arm of the balance beam 13 and in which a worm 14 uniformly moves the material towards the outlet 15 whence it is supplied to the sack 19 to be filled. The driving of the worm 14 is effected by means of a friction disc 17 which may be so made that during the process of weighing, the drive will be disconnected. This ensures an exact weighing, as the weighing machine is freely suspended.

When the weighing container 12 is filled, a pawl 30 mounted on the same, is engaged by a weighted locking lever 31 which holds the container 12 fast during its emptying or discharge, and the friction disc 17 is thrown into gear by hand, and the weighted contents of the container 12 are uniformly supplied to the sack. This may be accomplished by means of a down pipe 16 which is bent at its lower end 18 at right angles or practically at right angles, in order to change the vertical direction of flow of the material into a horizontal one. The bent pipe piece 18 forms at the same time a support for the sack 19.

In order to give the material in the pipe 16 the necessary speed, the diameter of this pipe must be greater than the diameter of the falling column of material. In this way, the required speed will be obtained by the free fall, without obstruction caused by friction on the walls, so that a reliable escape from the filling nozzle 18 is ensured, and such an excess of force is obtained that the sack can be filled without having to shake it.

In order to eliminate the resistance caused by the nonpermeability to air of the paper bags, the filling nozzle 18 is formed at its upper part with double walls (Figure 2) so that the air contained in the material and in the sack, may escape through the conduit 20 thus formed. As however there is a risk that dust will emerge through the conduit 20, the down tube is connected according to Figure 5 to a container 31a of any desired form, shortly before the point of admission of the material into the bag, preferably just in front of its bend. The air which is displaced from the pipe by the falling column of material, collects in the attached container or receiver 31a and thus allows the flowing material to pour freely into the bag. This container 31a is preferably provided with a non-return valve (not shown) opening outwards, so as to enable a portion of the air to escape outside.

The supply of material from the outlet 15 to the bag 19 may also take place through a short pipe in which a propeller or fan wheel (not shown) is mounted.

As the weighing and the filling are done separately and as therefore no closing device is required at the lower end of the down pipe 16, there can be no question of the column of material stopping in the pipe. In order to permit the filling to be carried on continuously, the machine may comprise two weighing machines 12a (see Figure 6) completely independent of each other, which supply through a hopper 21 the single filling tube 16a.

The weighing machine may be built as a pendulum weighing machine (see Figure 7). In this case, on the weighing beam 13a is mounted rotatably about a spindle 30b a container 22 which discharges into a fixed container 24 with a worm 14b which rotates constantly and independently of the weighing container, and on the latter being tipped, discharge the material uniformly into the filling pipe. In place of the rotatable container 22 a non-rotatable container with a bottom flap or valve may be provided.

The tipping of the weighing container 22 is effected by hand directly or indirectly by means of the device shown in Figures 8 and 9. After the weighing is completed, during which the weighing machine naturally descends, the weighing container 22, at the moment when the weight is reached, comes to rest on a rod 25 which is held by means of lever 26 arranged eccentrically of the weighing container 22 and under the same. This rod 25 is raised by hand by means of the levers 27 and 28, and the weighing machine is thus emptied. At the same moment the empty weighing container will tend to move upwards, and will engage by means of one or two projections 29 secured to the bottom of the container, behind the rod 25 which is then pulled down again by hand by means of the handle 27, owing to which the weighing container will be brought back to the horizontal position. Owing to the rod 25 being eccentrically mounted by means of the lever 26 relatively to the weighing container 22, the rod 25 will be now disengaged again from the projection 29 so that the weighing machine will be able to oscillate in a perfectly free manner, and the next weighing process will not be interfered with in any way.

By the same operation by which the weighing machine is brought back to the horizontal position, the quick-acting closing slide 3 may be opened in any desired manner, so that during the time in which the material runs into the bag, the weighing machine is filled again.

In the construction according to Figure 10, for the charging of the weighing container 32 from the hopper 33 there is used a breeches pipe 34 well known in itself, in the apex of which is arranged a tongue or valve 35 which is turned over by the material. In this way the supply of the material is positively reversed, and can take place without interruption, which means a substantial simplification as no closing parts are required for the hoppers.

Below the tipping weighing container 32 are arranged conveyor worms 36 each of which delivers to two filling pipes 38, 39 and 40, 41. To this end, between each worm 36 and the filling pipes, is inserted a breeches pipe 42, the branches of which open into each of the filling pipes, and the tongue 37 of which is automatically turned over, after each tipping of the weighing container, by the latter, or by the weighing machine. In this way, the filling pipes and, therefore, the bags, will be automatically and successively filled.

In the position shown in the drawings, the material passes into the left hand and weighing container which is tipped after it is filled. At the same time the tongue 35 is turned over, so that the material flows into the right hand weighing container 32. The material escaping from the left hand weighing container is conveyed by the left hand worm 36 into the left hand filling pipe 38. As soon as the right weighing container is filled, the same process is repeated, the material flows into the right hand filling pipe 41. The tongue 37 is turned over again by the right hand weighing container 32, so that the left hand weighing container is again filled and thereupon turns over the tongue 37, so that the filling pipe 39 is charged. The result of this is that the worms 36 can work with a much lower speed than hitherto, since as much time is available for the purpose as required for the filling and tipping of the two weighing containers 32. In this way the filling of the bag is made considerably slower. Another retardation is due to the fact that each worm discharges alternately into one or the other filling pipe, so that for the filling of the bag of the filling pipe 38 as much time is available as required for the charging of the filling pipes 39—40. Consequently the speed with which the material falls through the down pipe 38 may be still further reduced, which may be done for instance by reducing the diameter of the pipe 38. Notwithstanding this, the output of the machine will not be reduced, as the material flows continuously from the hopper 33, and only one attendant is required for the machine. Of course, for every filling pipe a separate weighing machine could also be provided, and each branch of the breeches pipes 34 could also deliver into one filling pipe.

Owing to the retardation of filling above described, no eddying or turbulence can take place, and the material has time to settle down automatically, that is to say, without any mechanical assistance, and to become heaped together, so that any formation of dust is avoided. Moreover, a more compact and therefore a stronger paper could be used for the bags as, owing to the slow filling, the air has sufficient time to escape through the valve, and need not pass through the walls of the bag. One consequence of this is that the bag may be for instance of two layers of paper instead of three as usual, which means a considerable reduction in cost. The third and most important advantage of this method of packing is that, owing to the slow filling, the material settles in the bag so firmly that a considerably larger quantity can be put up in the same volume. This means that with the usual filling of the paper bags with say 50 kg., they can be considerably smaller, which of course represents a further substantial reduction of cost.

Having now particularly described and ascertained the nature of my said invention and in what manner the same is to be performed, I declare that what I claim is:

1. In a machine for weighing and filling powdered material into automatically closing valve bags, a weighing machine for supplying material, a source of supply for supplying material to the machine, valve means for shutting off the material from the source of supply, controlled by the machine and arranged to be operated on the weighing by the machine of a determinate quantity of the material, and means for conducting the weighed material into the bag, comprising a guide supporting the bag and discharging into the bag, and a conveyor associated with the machine for moving the material for delivery into the guide.

2. In a machine for weighing and filling powdered material into automatically closing valve bags, a storage container for the material, provided with a discharge end, a releasable quick-acting device for closing the discharge end, a weighing machine disposed to receive material from the discharge end, means controlling the release of said device and adapted to be rendered operative for such purpose upon the weighing of a determinate quantity of material by the machine, and means for passing the weighed material into the bag including a filling pipe supporting the bag and discharging into the bag, and a conveyor associated with the machine for moving the material to the filling pipe.

3. In a machine for weighing and filling powdered material into automatically closing valve bags, a weighing machine, means for discharging material into the weighing machine, including a quick-closing shut-off device, means for rendering said device active for closing movement, depending for its operation upon the weighing of a determinate quantity of material by the machine, and means for conducting the weighed material from the machine into the bag, comprising a filling pipe supporting the bag and discharging into the bag, and a conveyor for removing the material laterally from the weighing machine for delivery to the filling pipe.

4. In a machine for weighing and filling powdered material into automatically closing valve bags, a storage container for the material, means for reducing the material into an emulsive state, a weighing machine for the material, a quick-acting closing device for the container controlled by the weighing machine and an independently driven horizontal conveyor device with a guide for filling the material into the bag.

5. In a machine for weighing and filling powdered material into automatically closing valve bags, a storage container for the material, means for weighing the material and independent means for filling the same into the bags, said means comprising a down or filling pipe being so arranged between the storage container and the valve bag that the filling of the bag is assisted by the kinetic energy of the column of material falling through the down pipe, said down pipe being bent at the bottom end in the horizontal or approximately horizontal direction, and said bent end being adapted to carry the bag.

6. In a machine for weighing and filling powdered material into automatically closing valve bags, a storage container for the material, means for weighing the material and independent means for filling the same into the bags, said means comprising a down or filling pipe being so arranged between the storage container and the valve bag that the filling of the bag is assisted by the kinetic energy of the column of material falling through the down pipe, said down pipe being bent at the bottom end in the horizontal or approximately horizontal direction, said bent end carrying the bag and having double walls forming a conduit leading into the open.

7. In a machine for weighing and filling powdered material into automatically closing valve bags, a storage container for the material, a quick-acting closing device for the container comprising a slide, levers independent of each other and bell crank levers jointed to the levers and carrying each two pressure rollers pressing the slide against surfaces of the container, means for weighing the material and independent means for filling the same into the bags.

8. In a machine for weighing and filling powdered material into automatically closing valve bags, means for weighing the material and independent means for filling the same into the bags so slowly that no eddying can take place, and the material settles down automatically without mechanical assistance.

9. In a machine for weighing and filling powdered material into automatically closing valve bags, a supply container, a weighing container including weighing mechanism for weighing a determinate bag-full of material, a quick-acting shut-off device associated with the supply container, means under the control of the weighing mechanism controlling the operation of the shut-off device as the determinate bag-full is reached, guide means forming a support for the bag arranged to receive the determinate bag-full of material as weighed and to direct such material into the supported bag, and a feeder device associated with the guide means and adapted to effect the feeding into the bag of the determinate bag-full received by the guide means.

10. In a machine for weighing and filling powdered material into automatically closing valve bags, a supply container, a weighing container including weighing mechanism for weighing a determinate bag-full of material, a quick-acting shut-off device associated with the supply container, means under the control of the weighing mechanism controlling the operation of the shut-off device as the determinate bag-full is reached, guide means forming a support for the bag arranged to receive the determinate bag-full of material as weighed and to direct such material into the supported bag, and a feeder device associated with the guide means and adapted to effect the feeding into the bag of the determinate bag-full received by the guide means as the weighing mechanism weighs the next determinate bag-full and effects the operation of the shut-off device.

11. In a machine for weighing and filling powdered material into automatically closing valve bags, a guide member open at both ends for receiving the weighed material at one open end and guiding it to be discharged out of the other open end and extending into the valve bag held thereon, a container for weighing the material to be bagged, adapted to receive the amount of the weighed material only and to discharge it therefrom as weighed to the receiving end of said guide member and having operative means for feeding the material to the open receiving end of said guide member, said reception of material in the container, its weighing, its discharge therefrom, its passage through said guide member into the valve bag being successively continuous.

12. In a machine for weighing and filling material into automatically closing valve bags, a weighing container including weighing mechanism for weighing the charge of the material, a spout part carried by the weighing container, extending substantially horizontally laterally therefrom, means, independent of the weighing container, for filling the weighed material into the bag, said means comprising a filling pipe adapted to constitute the support for the bag, said filling pipe being arranged to receive the weighed material from the spout part and extending from adjacent the spout part into the interior of the bag, and a conveyor in the container, extending into the spout part for moving weighed material from the container and along the spout part for discharge into the filling pipe.

13. A machine of the character described comprising a feeder for material, said feeder being characterized by having a releasable quick action discharge control, weighing mechanism, a container operatively carried thereby in a position to receive the material discharged from the feeder, said weighing mechanism being constructed and arranged to operate automatically for weighing a predetermined quantity of material deposited within the container, means under the control of the operation of the weighing mechanism commanding the release of said discharge control, and means, independent of the weighing mechanism, for filling the weighed material into the bag, said means comprising a filling pipe adapted to constitute the support for the bag, said filling pipe being arranged to receive the weighed material from the weighing mechanism and extending from adjacent the weighing mechanism into the interior of the bag, to effect compact filling of the bag by reason of the energy developed by the material itself in falling downwardly through the filling pipe.

14. A machine of the character described comprising, in combination, a feeder for material, a quick action discharge control associated with the feeder and normally releasable to assume a position for shutting off the discharge of material, weighing mechanism operatively carrying a container disposed to receive therein the material discharged from the feeder, said weighing mechanism being constructed and arranged to operate automatically and independently of the feeder for weighing a predetermined quantity of material discharged into the container by the feeder, and means under the control of the operation of the weighing mechanism as it functions to weigh the predetermined quantity of material, commanding the release of the discharge control.

15. A machine of the character described, comprising, in combination, with a feeder, a slide device associated therewith, movable into and out of a position in which the discharge from the feeder is shut off, a spring acting on said device, a trigger device adapted to interlock with said slide device so as to hold the latter in non-shut off position against the action of the spring, weighing mechanism operatively carrying a container disposed to receive therein the material discharged by the feeder, said weighing mechanism being constructed and arranged to operate automatically and independently of the feeder for weighing a predetermined quantity of the material discharged into the container, and means for operating said trigger device to permit the spring to be called into action, said means being arranged to be operated by the weighing mechanism as the weighing mechanism operates to weigh the predetermined quantity of material within the container.

16. In a machine for weighing and filling powdered material into automatically closing valve bags, a storage container for the material, means for weighing the material and independent means for filling the same into the bags, said means comprising a down or filling pipe being so arranged between the storage container and the valve bag that the filling of the bag is assisted by the kinetic energy of the column of material falling through the down pipe, said down pipe being bent at the bottom at an angle to the adjacent portion of the pipe for entering a valve in the side of a bag and for supporting the top of the bag.

17. In a machine for weighing and filling powdered material into automatically closing valve bags, a storage container for the material, means for weighing the material, independent means for filling the same into the bags, said means comprising a down or filling pipe being so arranged between the storage container and the valve bag that the filling of the bag is assisted by the kinetic energy of the column of material falling through the down pipe, said down pipe being bent at the bottom at an angle to the adjacent portion of the pipe for entering a valve in the side of a bag and for supporting the top of the bag, and positively operated conveyor means for delivering the material from adjacent the weighing means to the top of said pipe.

18. In a machine for weighing and filling powdered material into automatically closing valve bags, a storage container for the material, means for weighing the material including a receptacle, independent means for filling the material into bags comprising a breeches type downwardly extending filling pipe being so arranged between the receptacle and the valve bag that the filling of the bag is assisted by the kinetic energy of the column of material falling through the pipe, each branch of said pipe being bent at the bottom at an angle to the adjacent portion of the pipe for entering a valve in the side of a bag and for supporting the top of the bag, and means to direct a given charge of weighed material from the receptacle into one of the branches of said pipe.

19. In a machine for weighing and filling powdered material into automatically closing bags, a storage container for the material, means for weighing the material including a receptacle, independent means for filling the material into bags comprising a breeches type downwardly extending filling pipe being so arranged between the receptacle and the valve bag that the filling of the bag is assisted by the kinetic energy of the column of material falling through the pipe, each branch of said pipe being adapted to enter a container valve for discharging weighed material into the container, and means to direct a given charge of weighed material from the receptacle into one of the branches of said pipe.

20. In a machine for weighing and filling powdered material into automatically closing valve bags, a storage container for the material, means for weighing the material including a receptacle, independent means for filling the material into bags comprising a breeches type downwardly extending filling pipe being so arranged between the receptacle and the valve bag that the filling of the bag is assisted by the kinetic energy of the column of material falling through the pipe, each branch of said pipe being adapted to enter a container valve for discharging weighed material into the container, and means to direct a given charge of weighed material from the receptacle into one of the branches of said pipe, said last-named means including a positively operated conveyor for delivering weighed material to the pipe.

21. In a machine for weighing and filling particles of material into valve containers, means for weighing the material, means to supply the material to the weighing means, means independent of the weighing means for filling the material into the containers, said independent means comprising a downwardly extending filling pipe so arranged between the weighing means and the container that the filling of the bag is assisted by the kinetic energy of the falling material, and positively operated conveyor means for delivering the material from adjacent the weighing means to the top of said pipe.

22. In a machine for weighing and filling powdered material into automatically closing valve bags, a supply container having operative means for supplying a charge of material, a weighing container for weighing the charge having operative means to discharge therefrom the weighed charge, said weighing container having connected therewith means for controlling the operative means for supplying the charge, guide means including a spout for receiving the weighed charge constructed and arranged to operate in the capacity of a guide for guiding the charge into the valve bag, said containers and guide means being arranged successively and the aforesaid means combined therewith operating successively so as to provide machine operations in continuity for supplying, weighing, and guiding the charge into the bag.

In testimony whereof I affix my signature.

ARNO ANDREAS.